US00RE35167E

United States Patent [19]

Mouchawar et al.

[11] E Patent Number: Re. 35,167

[45] Reissued Date of Patent: Mar. 5, 1996

[54] MEDICINE VIAL CAP FOR NEEDLELESS SYRINGE

[76] Inventors: Marvin L. Mouchawar, 1 Iris La.; Alan E. Mouchawar, 1 Marigold La., both of San Carlos, Calif. 94070

[21] Appl. No.: 970,368

[22] Filed: Nov. 2, 1992

Related U.S. Patent Documents

Reissue of:

[64] Patent No.: 5,036,992
Issued: Aug. 6, 1991
Appl. No.: 499,760
Filed: Mar. 27, 1990

[51] Int. Cl.[6] ..... B65D 51/16; B65D 39/00

[52] U.S. Cl. ..... 215/307; 215/247; 215/248; 215/355; 604/415

[58] Field of Search ..... 215/227, 247, 215/248, 253, 307, 309, 310, 354, 355, DIG. 3; 604/415, 56, 82, 87, 88, 90, 403; 141/27, 325, 326

[56] References Cited

U.S. PATENT DOCUMENTS

| | | | |
|---|---|---|---|
| 2,190,054 | 2/1940 | Cutter et al. | 215/247 |
| 2,388,634 | 11/1945 | De Woody . | |
| 2,421,313 | 5/1947 | Brandon | 215/247 |
| 2,608,972 | 9/1952 | Chrigstrom . | |
| 2,689,562 | 9/1954 | Adams et al. . | |
| 2,783,909 | 3/1957 | Roberts | 215/247 |
| 2,842,276 | 7/1958 | Butler . | |
| 3,005,455 | 10/1961 | Poitras et al. . | |
| 3,230,954 | 1/1966 | Burgess et al. | 215/247 X |
| 3,313,439 | 4/1967 | Robinson | 215/247 |
| 3,337,074 | 8/1967 | Spaeth et al. | 215/309 |
| 3,460,702 | 8/1969 | Andrews . | |
| 3,603,310 | 9/1971 | Mottin et al. . | |
| 4,163,500 | 8/1979 | Gunne et al. . | |
| 4,187,893 | 2/1980 | Bujan | 215/247 X |
| 4,230,112 | 10/1980 | Smith . | |
| 4,341,319 | 7/1982 | Ogasawara . | |
| 4,515,752 | 5/1985 | Miramanda . | |
| 4,700,861 | 10/1987 | Neward | 215/309 |
| 4,703,865 | 11/1987 | Bates . | |
| 4,954,149 | 9/1990 | Fullemann | 215/247 X |
| 5,060,812 | 10/1991 | Ogle, II | 215/247 |

FOREIGN PATENT DOCUMENTS

| | | |
|---|---|---|
| 2900807 | 7/1979 | Germany . |
| 2176468 | 12/1986 | United Kingdom . |

*Primary Examiner*—Allan N. Shoap
*Assistant Examiner*—Nathan Newhouse
*Attorney, Agent, or Firm*—Skjerven, Morrill, MacPherson, Franklin & Friel; T. Lester Wallace

[57] ABSTRACT

According to the present invention, a vial cap is provided which has two openings, one for receiving the neck of a syringe and allowing medicine to flow into the syringe, and another for allowing air to flow into the vial as medicine is extracted. A safety lid to the vial cap is preferably provided for assuring sterility. A membrane may also be provided to cover the interior surface of the vial cap so that no medicine leaks into the region between the vial cap and its safety lid while the medicine is being transported and stored.

The shape and size of the two openings may be varied according to the application, in particular according to the material used for the cap and the medicine being stored in the vial.

12 Claims, 8 Drawing Sheets

MEDICINE VIAL CAP FOR NEEDLELESS SYRINGE

Matter enclosed in heavy brackets [ ] appears in the original patent but forms no part of this reissue specification; matter printed in italics indicates the additions made by reissue.

FIELD OF THE INVENTION

This invention relates to the field of medicine, more particularly to transferring medicine from a container to a patient in a safe and efficient manner.

BACKGROUND OF THE INVENTION

Medicine for injection into a patient is commonly provided in a vial having a cap of rubber or plastic such as vial 16 of FIG. 1 having cap 15h. To remove the medicine from the vial, a medical practitioner inserts at hollow needle 14 which is attached to a syringe 17 through the cap 15 into the vial 16, presses a plunger 11 of the syringe 17 to pressurize the vial 16, and pulls back the plunger 11 until the desired dosage of medicine has been transferred from the vial to the syringe. The needle 14 used for removing the medicine from the vial is often not used to inject the medicine into the patient. For example, if the medicine is to be injected intravenously, the needle 14 for removing medicine from the vial is commonly discarded and the neck 12 of the syringe is attached to an intravenous system to administer the medicine.

This conventional procedure for transferring medication from a vial to a patient has the disadvantages that a medical practitioner is exposed to the danger of needle pricks, also that the practitioner frequently must perform the extra steps of unwrapping and attaching the needle to the neck of the syringe, pressurizing the vial before removing medicine, and removing the needle from the syringe and disposing of the needle before transferring the medicine to the patient.

SUMMARY OF THE INVENTION

The present invention provides a system which avoids the unnecessary danger to the practitioner by avoiding the use of a needle, saves steps in the medicine transfer process, and saves the cost of a needle for removing medicine from the vial.

According to the present invention, a vial cap is provided which has two openings, one for receiving the neck of a syringe and allowing medicine to flow into the syringe, and another for allowing air to flow into the vial as medicine is extracted. A safety lid to the vial cap is preferably provided for assuring sterility. A membrane may also be provided to cover the interior surface of the vial cap so that no medicine leaks into the region between the vial cap and its safety lid while the medicine is being transported and stored.

The shape and size of the two openings may be varied according to the application, in particular according to the material used for the cap and the medicine being stored in the vial.

BRIEF DESCRIPTION OF THE DRAWINGS

FIGS. 5b and 5c show top and bottom views of the vial cap of FIG. 5a.

DETAILED DESCRIPTION OF SEVERAL EMBODIMENTS

Figure 1:
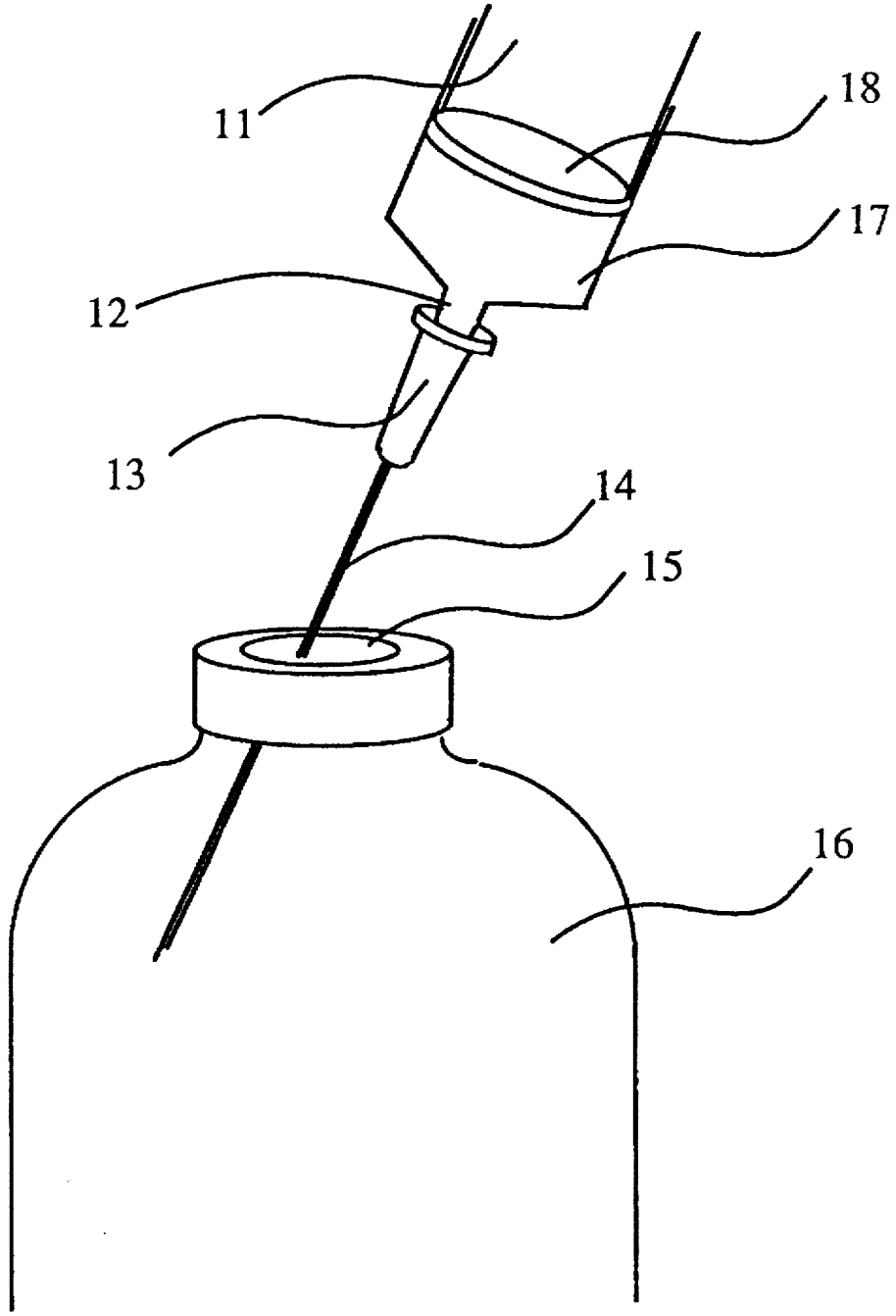
Fig. 1 (Prior Art)
FIG. 1 shows a prior art system for removing medicine from a vial.
Figure 2:
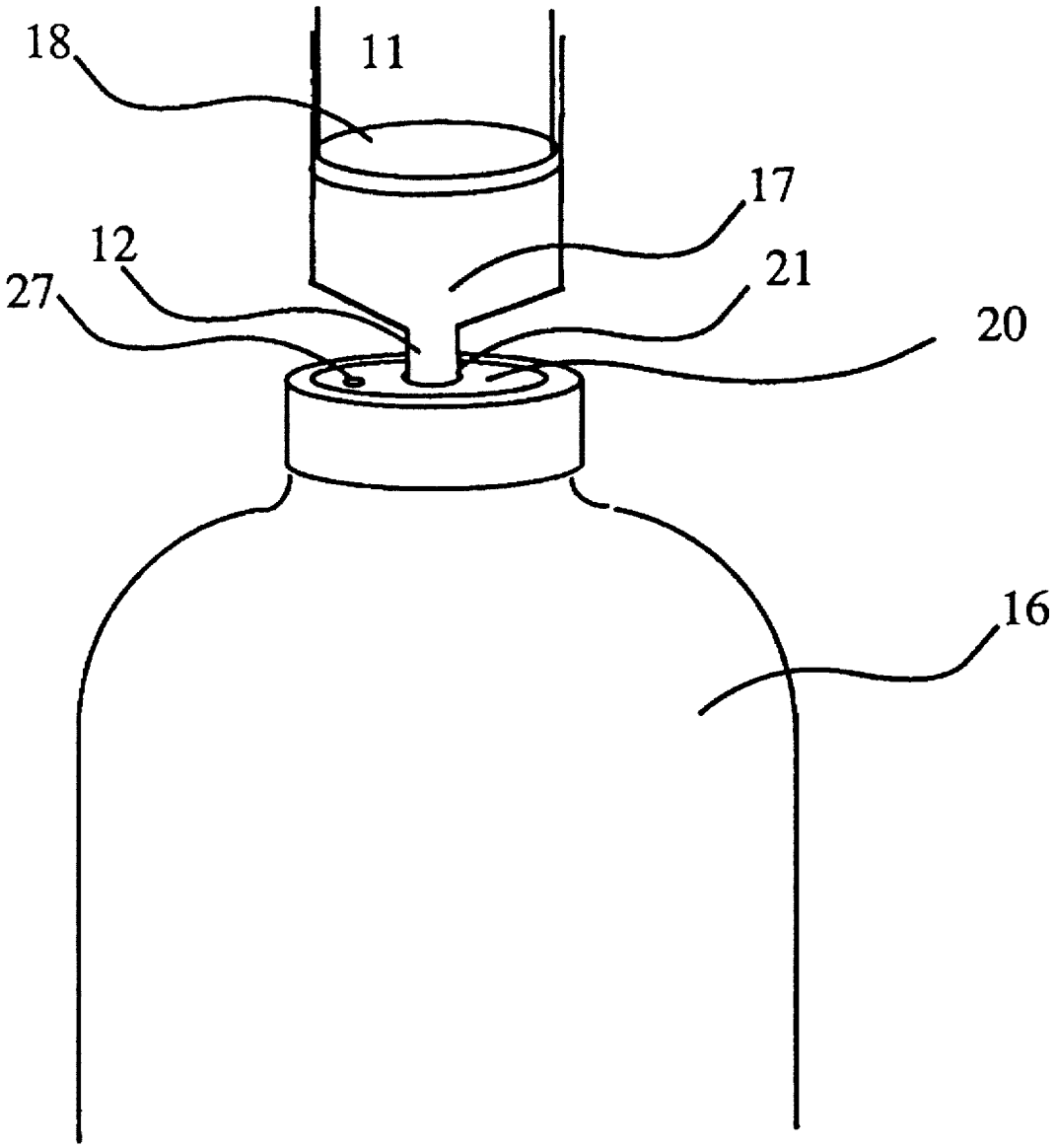
FIG. 2 shows a system using a vial cap of the present invention.

As shown in FIG. 2, according to the present invention, a vial cap 20 includes a syringe opening 21 for insertion of the neck 12 of a syringe 17. Vial cap 20 also includes an air vent 27 for admitting air as medicine is removed from vial 16 through syringe opening 21.

Figure 3:
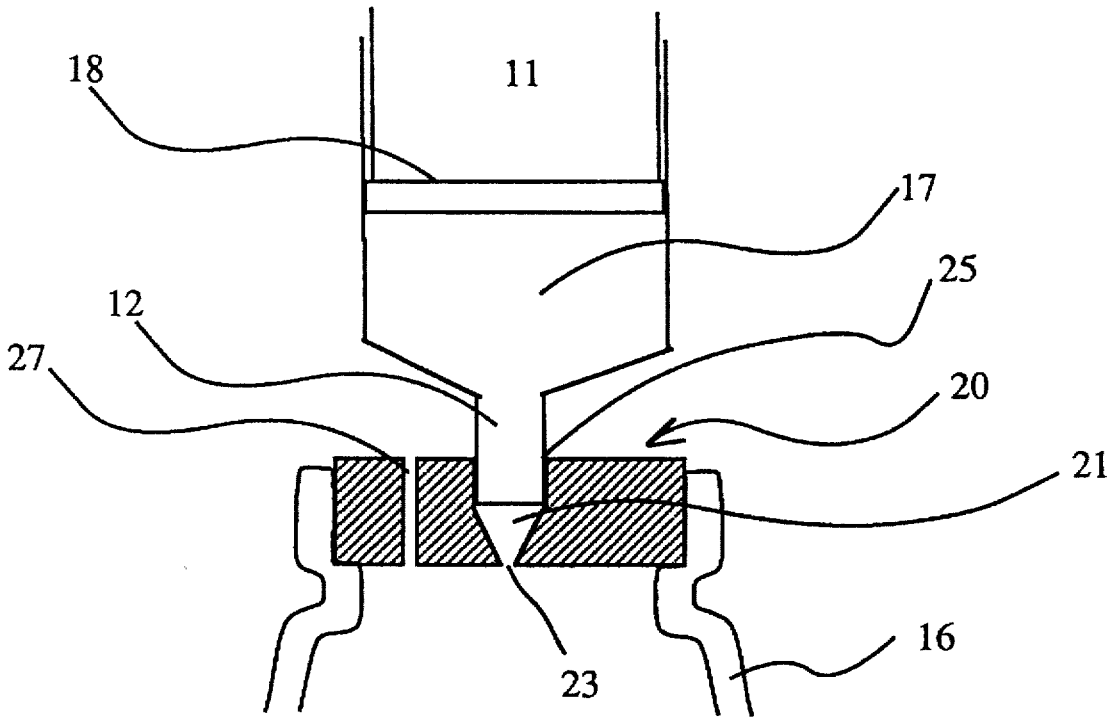
FIG. 3 shows a cross section of one embodiment of a vial cap of the present invention.

FIG. 3 shows a cross section of one embodiment of the vial cap of the present invention. As can be seen in FIG. 3, syringe opening 21 includes a large end 25 for receiving neck 12 of syringe 17 and a small end 23 for allowing flow of medicine from vial 16 into syringe 17. Large end 25 is sized to form an air tight seal against a standard syringe neck 12. One standard syringe neck has a diameter of approximately 4 min. Depending upon the elasticity of the material used for fabricating cap 20, large end 25 may be slightly smaller than the diameter of the syringe neck such that when neck 12 of syringe 17 is inserted into cap 20, large end 25 forms an airtight seal with neck 12. The lower diameter 23 of syringe opening 21 is sufficiently small to prevent flow of medicine into opening 21 while the vial is being stored, inverted and transported. However, opening 23 is sufficiently large to allow flow of medicine upon application of suction by syringe 17. The minimum diameter of air vent 27 may be smaller than opening 23 because it is not necessary that a liquid having higher molecule size, surface tension, and viscosity pass through air vent 27.

Figure 4:
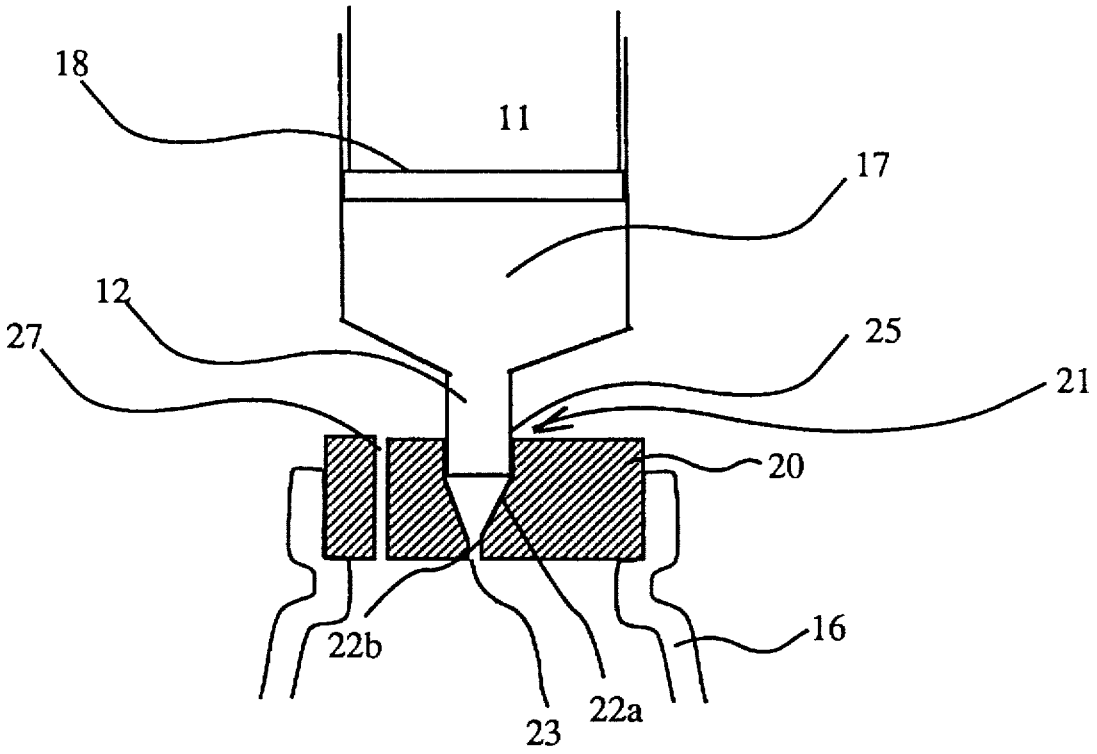
FIG. 4 shows a cross section of another embodiment of a vial cap of the present invention.

FIG. 4 shows an embodiment in which opening 21 includes both a sloping section 22a in which the diameter is decreased, and a cylindrical neck section 22b. This embodiment may best take advantage of surface tension of medicine against neck section 22b for preventing flow of medicine during storage and mild agitation of vial 16.

Figure 5A:
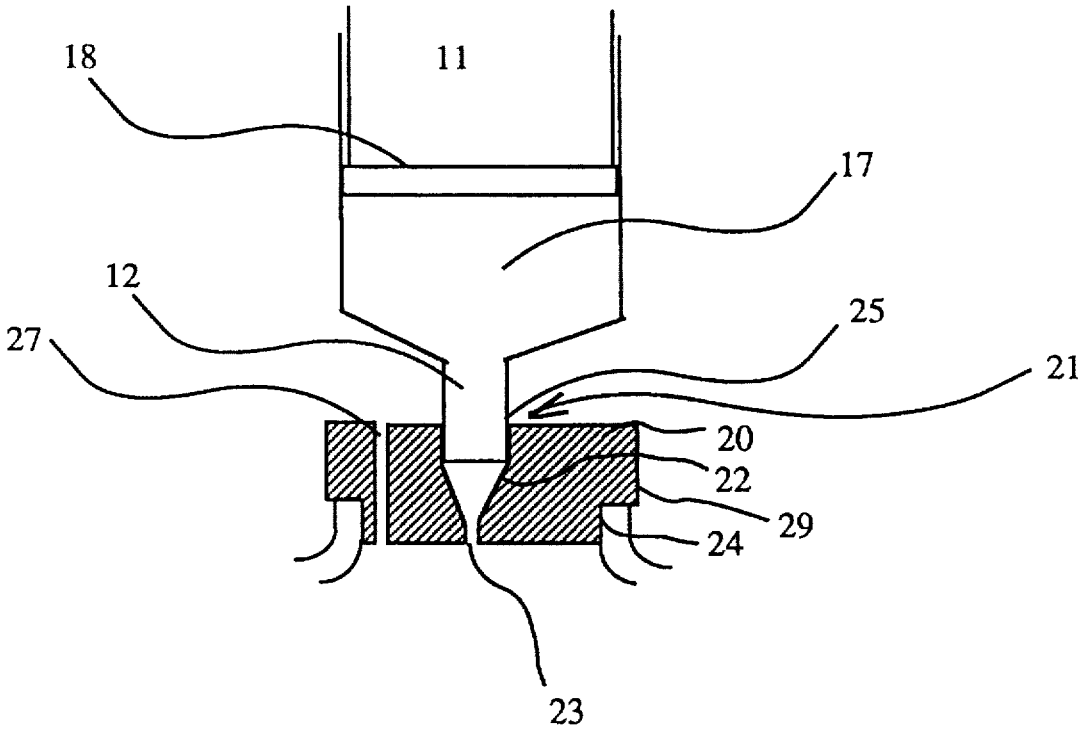
FIG. 5a shows a cross section of yet another embodiment of a vial cap of the present invention including a collar for holding the vial cap securely in position in the vial.

As shown in FIG. 5a, cap 20 may have an upper section 29 having a diameter larger than the vial to which it will attach and a lower section 24 having approximately the same diameter as the vial. Depending upon the composition of cap 20, the lower diameter 24 may be slightly larger than the inner diameter of the neck of the vial, such that a good seal is achieved by a friction fit. For one vial neck, upper section 29 has a diameter of 20 mm while lower section 24 has a diameter of 12 mm. For other vial necks, corresponding cap dimensions are provided. Alternatively, as shown in FIG. 5d, a collar 26 may be provided around lower section 24 for engagement with a corresponding ring (not shown) at the inner surface of the vial neck. Collar 26 achieves a positive closure but requires that the material of cap 20 be fairly flexible.

Figure 5B:
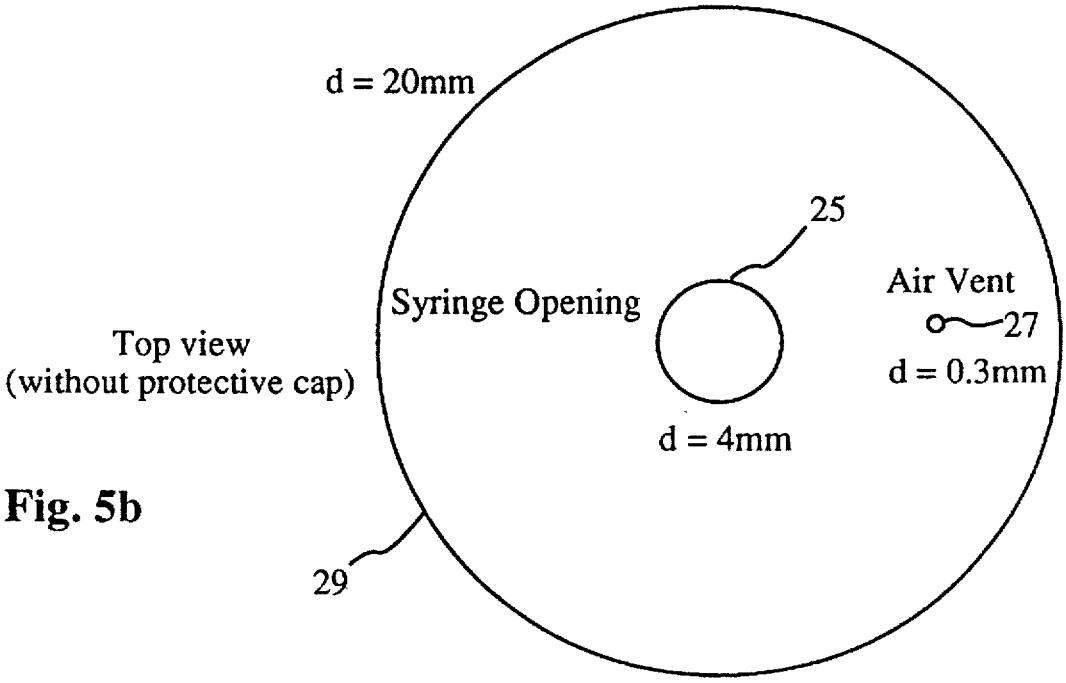
Figure 5C:
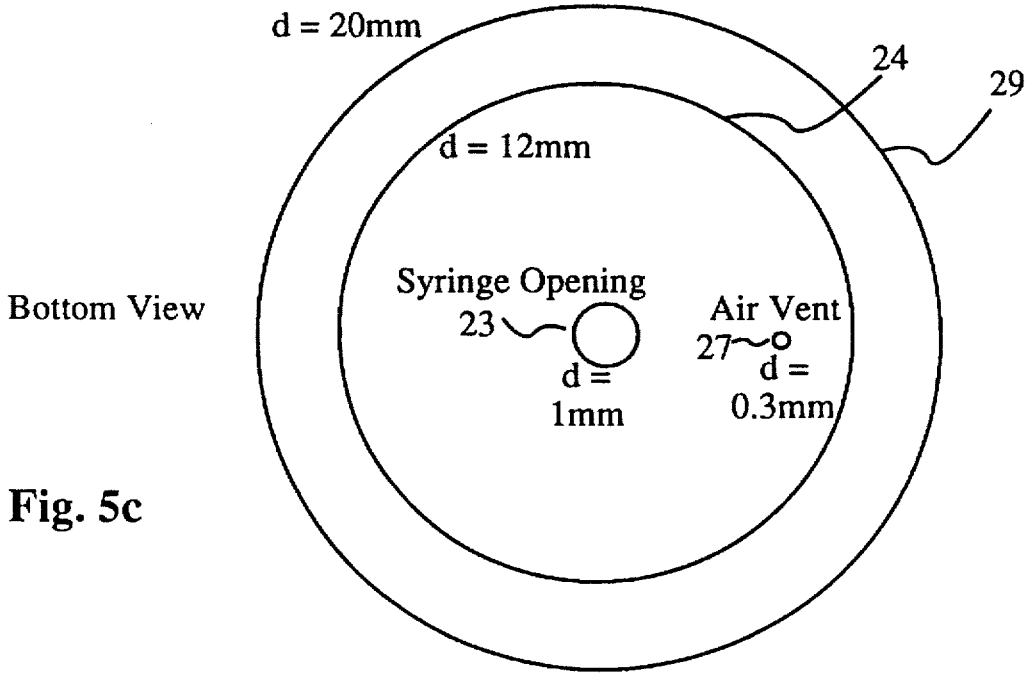
Figure 5D:
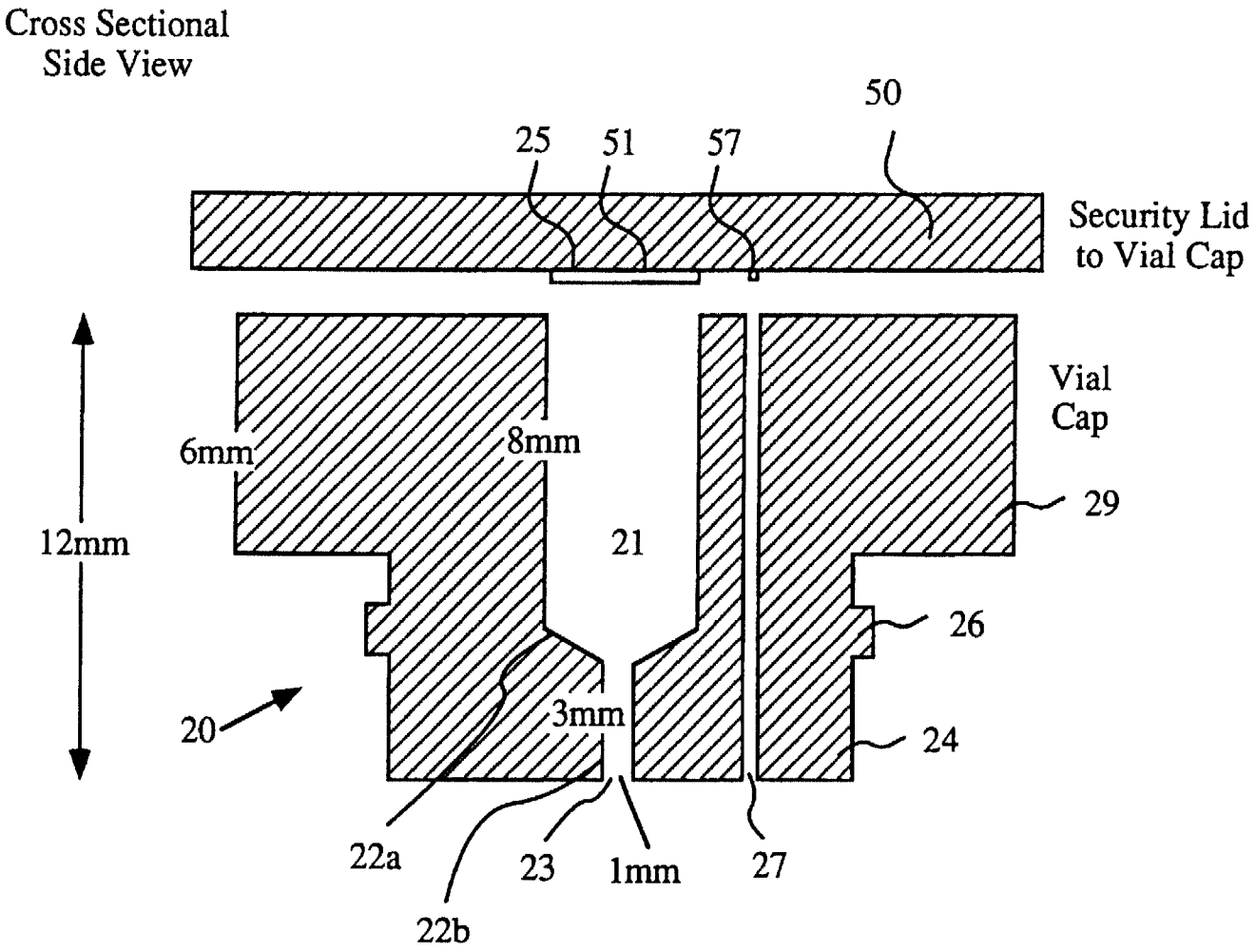
FIG. 5d shows the embodiment of FIG. 5a including a protective cover.

FIGS. 5b and 5c are top and bottom views, respectively, of the cap shown in FIG. 5a. As shown in FIGS. 5b and 5c, syringe opening 25 has a diameter of 4 mm while medicine opening 23 has a diameter of 1 mm. Air vent 27 has a diameter of 0.3 min. Cap 20 upper section 29 has a diameter of 20 mm and a lower diameter 24 of 12 mm. Again, other dimensions are provided to correspond to other vial dimensions.

FIG. 5d also shows safety lid 50 preferably included with vial cap 20 for protection of the surface of cap 20 from contamination. Safety lid 50 includes plug 51 which inserts into and closes opening 21, and plug 57 which inserts into and closes opening 27. Safety lid 50 provides an air tight seal to the top of cap 20, assuring sterility and preventing any leakage of the vial contents.

Figure 6A:
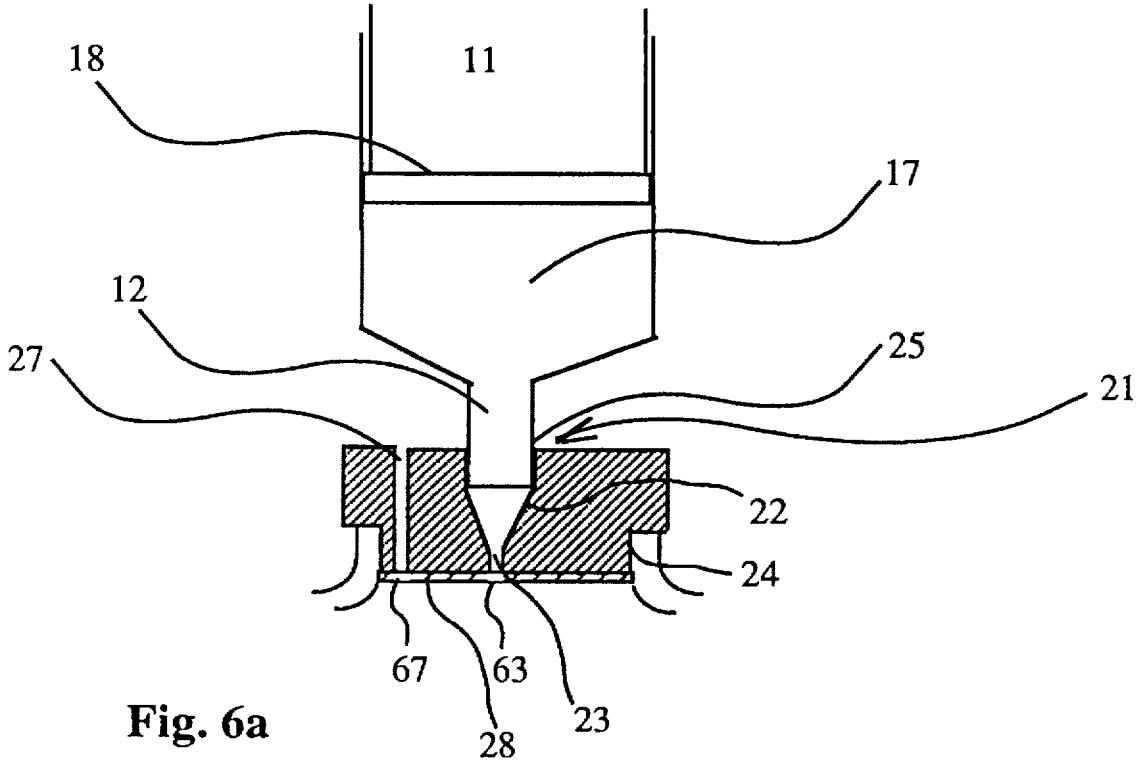
FIG. 6a shows a cross section of yet another embodiment of a vial cap of the present invention including a membrane at the lower surface of the vial cap covering the openings.
Figure 6B:
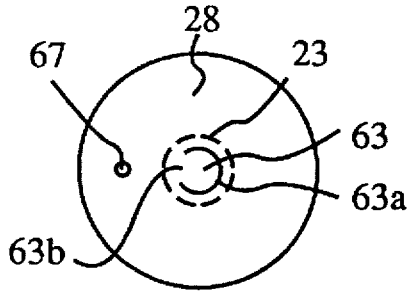
FIGS. 6b and 6c show a bottom view of membrane 28 of FIG. 6a with means for allowing medicine to flow through the vial cap.
Figure 6C:
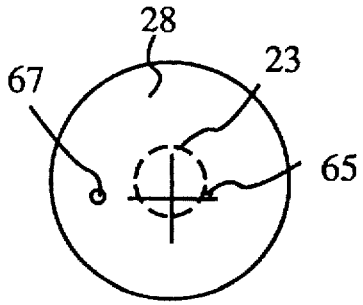

Other embodiments are also possible and may be preferred, depending upon the material of cap 20 and the composition of medicine in the vial. As shown in FIG. 6a, for additional protection of the medicine in the vial, a membrane 28 can be formed at the lower surface of cap 20. This membrane is preferably of a substance inert in the presence of the medicine. As shown in FIG. 6b, membrane 28 is preferably structured to have a breakable region 63 which contacts opening 23. Region 63 preferably breaks easily along a major part 63a of its perimeter but resists breaking along the remaining part 63b of its perimeter. This way, membrane 28 maintains medicine sealed from cap 20 and prevents a non-viscous medicine from passing into syringe opening 21 during storage. When syringe 17 neck 12 is inserted into opening 21 and suction is applied by withdrawing plunger 18, part 63a of region 63 breaks, allowing medicine to flow freely into syringe 17 while part 63b prevents a loose region 63 of membrane 28 from passing into syringe 17. Alternatively, as shown in FIG. 6c, an x-shaped thin pattern 65 in membrane 28 extending over opening 23, which will tear upon application of suction by syringe 17 may be provided in membrane 28. An x-shaped tear also allows medicine to flow freely while preventing any of membrane 28 from passing into syringe 17, and will function properly even if the center of the x is misaligned with the center of opening 23 during manufacture of cap 20.

As shown in FIG. 6b, a very small opening 67 which lies against air vent 27 is provided in membrane 28.

Since this opening does not allow passage of liquids and since membrane 28 is thin with respect to cap 20, opening 67 may be smaller than air vent 27. Alternatively, opening 67 may be replaced by a flap (not shown) which covers vent 27 during storage but acts as a valve, moving away from the lower surface of cap 20 to admit air when suction is applied by syringe 17.

The embodiments described above can receive either syringe 17 or the standard Leur Lok® syringe (Leur Lok® is a registered trademark of Beeton, Dickinson & Co.) not shown, and thus are versatile to use. In addition, since all embodiments except that shown in FIGS. 6a and 6b are of unitary construction, they are exceedingly inexpensive to manufacture. Manufacture of cap 20 is preferably by injection plastic molding forming a single-piece plastic part in a two-part mold. A plurality of vial caps are formed between upper and lower plates of one mold using simple well-known molding techniques.

In light of the above description of several preferred embodiments of the present invention, other embodiments will become obvious to those skilled in the art. Such other embodiments are intended to fall within the scope of the present invention.

We claim:

1. A vial cap for allowing medicine to be extracted from a vial by a syringe comprising:

said vial cap defining a fast opening having an upper end sized to mate with a neck of a syringe and a lower end sized to prevent flow of medicine of a viscosity with which said cap is to [e] *be* used in response to gravity and to allow flow of said medicine upon application of pressure; and said vial cap further defining a second opening sized to allow flow of air but prevent flow of said medicine.

2. A vial cap in claim 1 further comprising a cover attached to an upper surface of said vial cap, said cover closing said first and second openings.

3. A vial unit for allowing medicine to be extracted from a vial by a syringe comprising:

a vial cap defining a first opening having an upper end sized to mate with a neck of a syringe and a lower end sized to prevent flow of medicine of a viscosity with which said cap is to be used in response to gravity and to allow flow of said medicine upon application of pressure;

said vial cap further defining a second opening sized to allow flow of air but prevent flow of said medicine; and a vial having a neck opening to which said vial cap is attached.

4. A vial cap as in claim 1 in which said cap has a round cross section and said first opening is formed in the center of said round cross section.

5. A vial cap as in claim 1 in which said vial cap has an upper surface including said upper end and a lower surface including said lower end, said lower surface being covered by a membrane which covers said lower end, said membrane comprising means for being opened adjacent said lower end in response to suction applied to said first opening.

6. A vial cap as in claim 5 in which said membrane further covers said second opening and includes means for allowing air to pass from said second opening to said vial when medicine is being removed from said vial.

7. A vial cap for allowing medicine to be extracted from a vial by a syringe comprising:

said vial cap defining a first opening having an upper end sized to mate with a neck of a syringe and a lower end sized to prevent flow of medicine in response to gravity and to allow flow of medicine upon application of pressure; and said vial cap further defining a second opening sized to allow flow of air but prevent flow of medicine; mid vial cap having an upper surface including said upper end and a lower surface including said lower end, said lower surface being covered by a membrane which covers said lower end, said membrane comprising means for being opened adjacent said lower end in response to suction applied to said first opening.

*8. An apparatus, comprising:*

*a medicine vial;*

*a liquid medicine suitable for intravenous injection into a patient; and*

*a cap sealing the liquid medicine in the medicine vial, the cap defining an opening, the opening formed such that a seal is established when a neck of a syringe is inserted into the opening, a portion of the cap being rupturable under a pressure exerted by the syringe so*

*that the liquid medicine can pass from the medicine vial and into the syringe when the neck of the syringe is disposed in the opening in the cap and a plunger of the syringe is moved.*

*9. An apparatus, comprising:*

*a medicine vial;*

*a liquid medicine suitable for intravenous injection into a patient; and*

*a cap sealing the liquid medicine in the medicine vial, a rupturable portion of the cap being rupturable under a pressure exerted by a syringe having a plunger when no needle is attached to a neck of the syringe, the cap defining an opening, the rupturable portion forming bounding surface of the opening.*

*10. The apparatus of claim 9, wherein the opening is formed to engage the neck of the syringe when the rupturable portion is ruptured by the syringe and after the rupturable portion is ruptured by the syringe.*

*11. A method, comprising the steps of:*

*(a) forcing a neck of a syringe into an opening in a cap of a medicine vial, no needle being attached to the neck of the syringe when the neck of the syringe is forced into the opening in the cap, the medicine vial having a neck, a portion of a cylindrical inside surface of the neck of the medicine vial having an axis, the syringe having a plunger movable in an axial dimension of the syringe;*

*(b) after step (a) and when the neck of the syringe is disposed in the opening in the cap so that the axial dimension of the syringe is substantially parallel to or collinear with the axis of the portion of the inside surface of the neck of the medicine vial, extracting medicine from the medicine vial by moving the plunger in the axial dimension; and*

*(c) introducing the medicine extracted from the medicine vial into a patient by coupling the syringe to an intravenous system and then injecting the medicine from the syringe and into the intravenous system.*

*12. A method, comprising the steps of:*

*(a) rupturing a portion of a cap of a medicine vial using a syringe, no needle being attached to a neck of the syringe;*

*(b) after step (a), extracting a medicine from the medicine vial using the syringe by moving a plunger of the syringe; and*

*(c) introducing the medicine extracted from the medicine vial into a patient by coupling the syringe to an intravenous system and then injecting the medicine from the syringe and into the intravenous system.*

* * * * *